United States Patent
Straehle (10) Patent No.: US 11,536,630 B2
(45) Date of Patent: *Dec. 27, 2022

(54) METHOD AND DEVICE FOR DETECTING ANOMALIES IN SENSOR RECORDINGS OF A TECHNICAL SYSTEM

(71) Applicant: Robert Bosch GmbH, Stuttgart (DE)

(72) Inventor: Christoph-Nikolas Straehle, Ingolstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/378,019

(22) Filed: Jul. 16, 2021

(65) Prior Publication Data
US 2022/0026312 A1   Jan. 27, 2022

(30) Foreign Application Priority Data
Jul. 21, 2020  (DE) .......................... 102020209162.5

(51) Int. Cl.
*G06F 11/30*     (2006.01)
*G01M 99/00*    (2011.01)
*G06N 20/00*    (2019.01)

(52) U.S. Cl.
CPC .......... *G01M 99/005* (2013.01); *G06N 20/00* (2019.01)

(58) Field of Classification Search
CPC .................................................. G01M 99/005
See application file for complete search history.

(56) References Cited

U.S. PATENT DOCUMENTS

2020/0209111 A1 *  7/2020  Lavid Ben Lulu ... G01M 15/14

FOREIGN PATENT DOCUMENTS

DE    102019219727 A1    7/2020
DE    112018007100 T5    11/2020

OTHER PUBLICATIONS

Lu et al., "Structured Output Learning With Conditional Generative Flows," Cornell University, 2020, pp. 1-12. <https://arxiv.org/pdf/1905.13288.pdf> Downloaded Jul. 16, 2021.

* cited by examiner

*Primary Examiner* — Phuong Huynh
(74) *Attorney, Agent, or Firm* — Norton Rose Fulbright US LLP; Gerard Messina (57) ABSTRACT

A computer-implemented method for detecting anomalies in sensor recordings of a technical system. The method including: ascertaining a first anomalous value which, with regard to all sensor recordings, characterizes whether or not an anomaly is present; ascertaining a plurality of second anomalous values, a second anomalous value from the second anomalous values corresponding to a sensor recording, and the second anomalous value, with regard to the sensor recording and under the condition of the occurrence of the other sensor recordings, characterizing whether or not an anomaly is present in the sensor recording; detecting an anomaly in a sensor recording of the sensor recordings if the first anomalous value characterizes the presence of an anomaly, and the second anomalous value corresponding to the sensor recording characterizes an anomaly, and the second anomalous value differs beyond a predefined extent from other second anomalous values of the second anomalous values.

8 Claims, 9 Drawing Sheets

Fig. 9

METHOD AND DEVICE FOR DETECTING ANOMALIES IN SENSOR RECORDINGS OF A TECHNICAL SYSTEM

CROSS REFERENCE

The present application claims the benefit under 35 U.S.C. § 119 of German Patent Application No. DE 102020209162.5 filed on Jul. 21, 2020, which is expressly incorporated herein by reference in its entirety.

FIELD

The present invention relates to a method for detecting anomalies in sensor recordings of a technical system, an anomaly detection device, a method for training the anomaly detection device, a training device, a computer program, and a memory medium.

BACKGROUND INFORMATION

German Patent Application No. DE 10 2020 208 642.7 describes a method and a device for detecting anomalies in technical systems.

You Lu, Bert Huang, "Structured Output Learning with Conditional Generative Flows," May 30, 2019, https://arxiv.org/abs/1905.13288v1, describes a method for training a conditional normalizing flow.

SUMMARY

For sensing physical surroundings state variables of the surroundings or operating state variables of a technical system, technical systems may use sensors that transmit corresponding sensor recordings to the technical system. However, a sensor may transmit erroneous signals, for example if it is defective. Redundant sensors, preferably of the same type, may be used to attenuate this problem.

It is desirable to monitor the sensor recordings of multiple sensors to be able to establish whether the sensor recordings have anomalous behavior, and if yes, which sensor or sensors is/are responsible for the anomalous behavior.

A method in accordance with an example embodiment of the present invention allows the recognition of anomalies in sensor recordings of a plurality of sensor recordings. If a sensor can be recognized as anomalous based on its output signal, this has the advantage that it may automatically be subjected to a check or replaced. Alternatively or additionally, it is possible that the technical system during operation advantageously no longer takes into account, temporarily or permanently, a sensor recording detected as anomalous for the further operation. This allows a correct operating mode of the technical system, even if a defective or unreliable sensor or an incorrect or anomalous sensor recording is present.

In a first aspect, the present invention relates to a computer-implemented method for detecting anomalies in a plurality of sensor recordings of a technical system. In accordance with an example embodiment of the present invention, the method includes the steps:
ascertaining a first anomalous value which, with regard to all sensor recordings of the plurality of sensor recordings, characterizes whether or not an anomaly is present;
ascertaining a plurality of second anomalous values, a second anomalous value from the plurality of second anomalous values corresponding to a sensor recording of the plurality of sensor recordings, and the second anomalous value, with regard to the sensor recording and under the condition of the occurrence of the other sensor recordings, characterizing whether or not an anomaly is present in the sensor recording;
detecting an anomaly in a sensor recording of the plurality of sensor recordings if the first anomalous value characterizes the presence of an anomaly, and the second anomalous value corresponding to the sensor recording characterizes an anomaly, and the second anomalous value differs beyond a predefined extent from other second anomalous values of the plurality of second anomalous values.

A sensor recording may be understood to mean a result of a measurement of a physical surroundings condition or a physical operating condition of the technical system with the aid of a suitable sensor. The plurality of sensor recordings is preferably recorded during operation of the technical system and at the same point in time.

In the context of the present invention, an anomaly may be present in a sensor recording or a sensor recording may be understood as anomalous if an occurrence of the sensor recording with regard to other measurements of the sensor corresponding to the sensor recording is unlikely. For example, sensor recordings may include values that fall into typical value ranges during operation of the technical system. A value being outside a value range that is typical for the value may be understood as unlikely or anomalous. A sensor recording in this case could be understood as anomalous if at least one value included in the sensor recording is outside a value range that is typical for the value.

The method may thus be understood such that for the plurality of sensor recordings, it is initially ascertained with the aid of the first anomalous value whether or not an anomaly with regard to the plurality of sensor recordings is present. For the case that an anomaly is present, via the plurality of second anomalous values it may be ascertained which sensor recording is responsible for the anomalous behavior. The method is preferably applied during operation of the technical system in order to allow anomalies to be detected during operation of the technical system. This has the advantage that in the event of an anomalous sensor signal, the technical system may still continue operation, for example by ignoring the sensor signal.

The plurality of sensor recordings may preferably be detected by a plurality of sensors and provided to the technical system. Sensors that are installed in the technical system as well as those that are not installed in the technical system, for example sensors that may observe the technical system from the outside, may be used.

The first anomalous value may preferably be a probability or a probability density value. In this case, an anomaly may be present in the plurality of sensor recordings if the first anomalous value is below a predefined first threshold value.

In addition, a second anomalous value may preferably be a conditional probability or a conditional probability density value that characterizes how probable an occurrence of the sensor signal corresponding to the second anomalous value is under occurrence of the other sensor signals of the plurality of sensor signals. In this case, the sensor recording corresponding to the second anomalous value may be understood as anomalous if the second anomalous value is below a predefined second threshold value. It is also conceivable for the second threshold value to be the first threshold value.

Furthermore, it is possible for the first anomalous value to be ascertained based on the plurality of sensor recordings, with the aid of a first anomaly detection model. The first anomalous value may preferably be ascertained by the first anomaly detection model with the aid of a machine learning method. The advantage of using the machine learning method is that the first anomalous value is thus ascertained more accurately than, for example, by ascertaining the first value with the aid of a rule-based method. This increases the accuracy with which the method may detect anomalies in the technical system.

In particular, the machine learning method may be a normalizing flow. In this case, the normalizing flow may be designed in such a way that it receives the plurality of sensor recordings as input and ascertains an output, the output or portions thereof being provided as the first anomalous value. The advantage of the normalizing flow for this purpose is that the normalizing flow may ascertain a very accurate probability or a very accurate probability density value with regard to the occurrence of the plurality of sensor recordings, resulting in more accurate detection of anomalies.

In accordance with an example embodiment of the present invention, it is also possible that for ascertaining the plurality of second anomalous values, for each sensor recording, a corresponding second anomaly detection model exists, which corresponds to the sensor recording in question and is designed to ascertain the second anomalous value corresponding to the sensor recording. The second anomaly detection model is preferably designed in such a way that it ascertains the second anomalous value in such a way that the second anomalous value characterizes an occurrence of the sensor recording under the condition of an occurrence of the other sensor recordings of the plurality of sensor recordings. The second anomalous value may preferably be ascertained by the second anomaly detection model with the aid of a machine learning method. The advantage of using the machine learning method is that the second anomalous value is thus ascertained more accurately than with the aid of a rule-based method, for example. This increases the accuracy with which the method may detect anomalies in the technical system.

In particular, the machine learning method may be a normalizing flow. In this case, the normalizing flow may be designed in such a way that it receives the sensor recordings of the plurality of sensor recordings, except for the corresponding sensor recording, as input and ascertains an output, the output or portions thereof being provided as the second anomalous value. The advantage of the normalizing flow for this purpose is that the normalizing flow may ascertain a very accurate probability or a very accurate probability density value with regard to the occurrence of all sensor recordings of the plurality of sensor recordings, except for the corresponding sensor recording, resulting in more accurate detection of anomalies.

In a further aspect, the present invention relates to a computer-implemented method for training the anomaly detection device. In accordance with an example embodiment of the present invention, the method includes the following steps:

providing a plurality of sensor recordings of the technical system or of a technical system having the same design or of a similar technical system;

training the first anomaly detection model based on the plurality of sensor recordings;

training the plurality of second anomaly detection models, in each case a second anomaly detection model for a sensor recording of the plurality of sensor recordings being trained in such a way that the second anomaly detection model ascertains a second anomalous value for the sensor recording under the condition of the occurrence of the other sensor recordings of the plurality of sensor recordings.

In the step of providing, the sensor recordings of the plurality of sensor recordings are preferably provided at the same point in time by a plurality of various sensors of the same type. The individual sensor recordings of the plurality of sensor recordings may therefore be understood as the particular measurement at the same point in time.

The plurality of sensor recordings may therefore be understood as a training datum for the method. For the training, preferably a plurality of training data is provided, and the first anomaly detection model and/or a second anomaly detection model are/is trained based on the plurality of training data.

In the step of training the first anomaly detection model, the first anomaly detection model may preferably be trained in such a way that it assigns to the sensor recordings of the plurality of sensor recordings a value that characterizes, for example, a probability or a probability density value with regard to the occurrence of the plurality of sensor recordings. For this purpose, the first anomaly detection model may be trained using a machine learning training method, for example a method that improves a log likelihood, ascertained by the first anomaly detection model, of the training data, for example using a stochastic gradient descent.

In the step of training the plurality of second anomaly detection models, a second anomaly detection model may be understood as corresponding to a sensor recording. The second anomaly detection model may preferably be trained in such a way that, to the sensor recording of a training datum, corresponding to the second anomaly detection model, it assigns a value that characterizes a probability or a probability density value with regard to an occurrence of the sensor recording under the condition of an occurrence of the other sensor recordings of the training datum. For this purpose, the second anomaly detection model may be trained using a machine learning training method, for example a method that improves a log likelihood, ascertained by the second anomaly detection model, of the corresponding sensor recording of a training datum, given the other sensor recordings of the training datum, for example using a stochastic gradient descent.

Furthermore, in accordance with an example embodiment of the present invention, it is possible for the plurality of sensor recordings to be provided by a second technical system having the same design as the technical system or being at least similar, for example when it uses or includes sensors having the same design. For example, the technical system may be a specific type of machine that manufactures a plurality of specimens. In this case it is conceivable for at least one these specimens to be used for recording the plurality of sensor recordings, and for the plurality of sensor recordings to then be used for training the anomaly detection device, which is used for the anomaly detection for at least one other specimen of the plurality of specimens.

In addition, it is possible for a sensor recording of prototypes of the technical system to be ascertained during the development process of the technical system. Within the meaning of the present invention, the prototypes may be understood as similar to the technical system, and the sensor recording thus ascertained is used for training the technical system.

Specific embodiments of the present invention are explained in greater detail below with reference to the figures.

DETAILED DESCRIPTION OF EXAMPLE EMBODIMENTS

Figure 1:
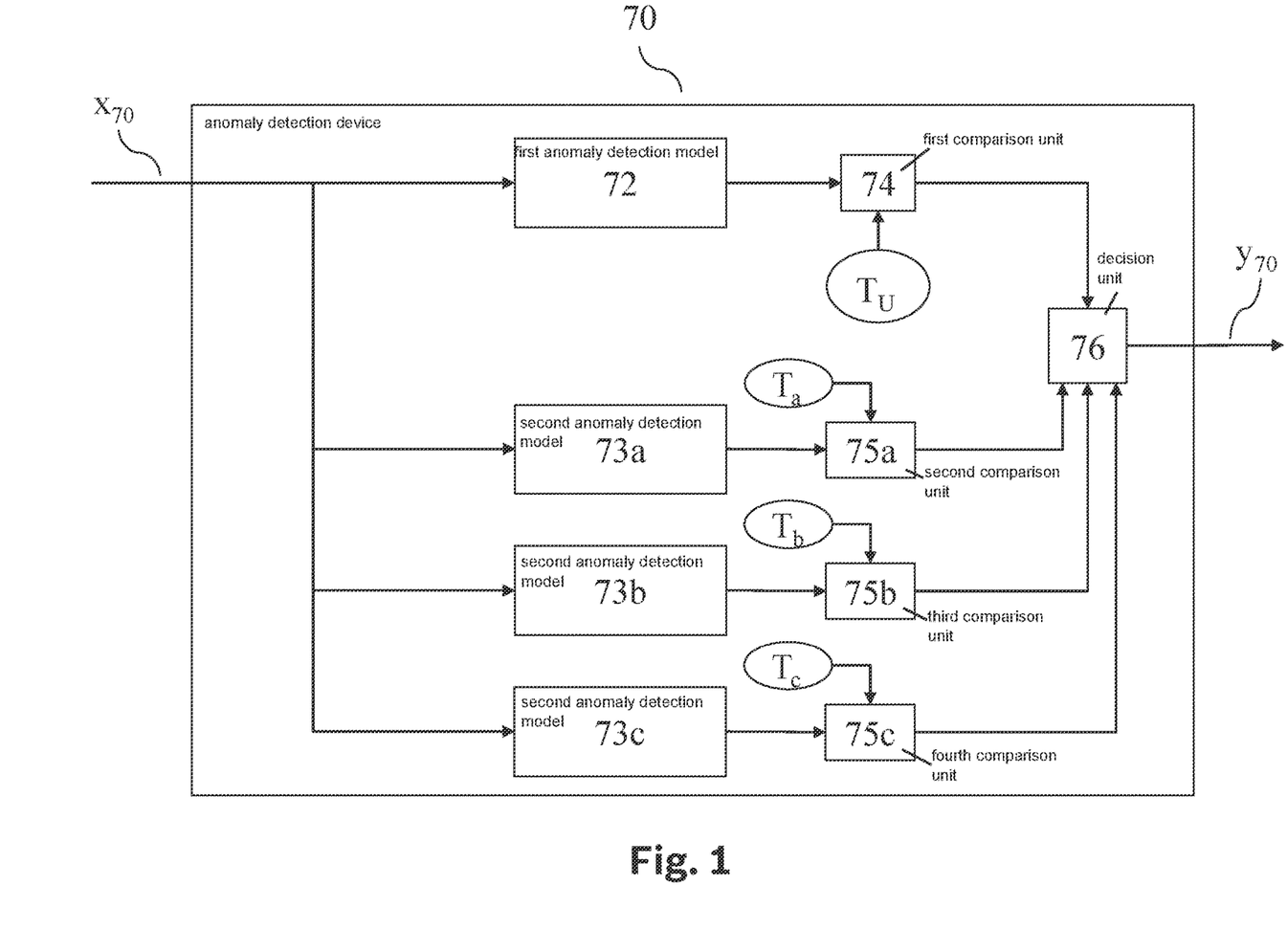
FIG. 1 schematically shows a design of an anomaly detection device, in accordance with an example embodiment of the present invention.

FIG. 1 shows an anomaly detection device 70 for detecting anomalies in one of three sensor recordings. Anomaly detection device 70 receives a first input signal $x_{70}$ that encompasses the three sensor recordings. First input signal $x_{70}$ is supplied to a first anomaly detection model 72, the first anomaly detection model being designed to ascertain a first probability density value that characterizes how probable the joint occurrence of the three sensor recordings is. In the exemplary embodiment, first anomaly detection model 72 is a normalizing flow.

Based on first input signal $x_{70}$, the first anomaly detection model ascertains a first probability density value, which is forwarded to a first comparison unit 74. First comparison unit 74 compares the first probability density value to a first threshold value $T_U$. For the case that the first probability density value is greater than or equal to first threshold value $T_U$, first comparison unit 74 transmits a first decision value to a decision unit 76, which characterizes that no anomaly is present in input signal $x_{70}$, i.e., in a combination of the three sensor recordings. Otherwise, first comparison unit 74 selects the first decision value in such a way that it characterizes the presence of an anomaly in input signal $x_{70}$. Optionally, first comparison unit 74 may also transmit the probability density value, ascertained by first anomaly detection model 72, to decision unit 76.

In addition, input signal $x_{70}$ is supplied to each of three second anomaly detection models 73a, 73b, 73c. For each of the sensor recordings contained in input signal $x_{70}$, a second anomaly detection model 73a, 73b, 73c exists, which corresponds to the sensor recording and which ascertains for the corresponding sensor recording a probability density value that characterizes how probable an occurrence of the sensor recording is, given an occurrence of the other sensor recordings of input signal $x_{70}$. In the exemplary embodiment, each of the three second anomaly detection models 73a, 73b, 73c is a conditional normalizing flow.

A first of the three second anomaly detection models 73a corresponds to a first sensor recording of input signal $x_{70}$. The first of the three second anomaly detection models 73a receives the three sensor recordings $x_{70}$. The first of the three second anomaly detection models 73a then ascertains a probability density value that characterizes how probable an occurrence of the first sensor recording of the three sensor recordings of input signal $x_{70}$ is, given an occurrence of the other sensor recordings of input signal $x_{70}$. The first of the three second anomaly detection models 73a then transmits the ascertained probability density value to a second comparison unit 75a. Second comparison unit 75a ascertains whether or not the ascertained probability density value is greater than or equal to a second threshold value $T_a$. If the ascertained probability density value is greater than or equal to second threshold value $T_a$, second comparison unit 75a transmits a second decision value to decision unit 76 which characterizes that no anomaly is present in the first sensor recording of input signal $x_{70}$.

Otherwise, second comparison unit 75a selects the second decision value in such a way that it characterizes the presence of an anomaly in the first sensor recording. Optionally, second comparison unit 75a may also transmit the probability density value, ascertained by the first of the three second anomaly detection models 73a, to decision unit 76.

A second of the three second anomaly detection models 73b corresponds to a second sensor recording of input signal $x_{70}$. The second of the three second anomaly detection models 73b receives the three sensor recordings $x_{70}$. The second of the three second anomaly detection models 73b then ascertains a probability density value that characterizes how probable an occurrence of the second sensor recording of the three sensor recordings of input signal $x_{70}$ is, given an occurrence of the other sensor recordings of input signal $x_{70}$. The second of the three second anomaly detection models 73b then transmits the ascertained probability density value to a third comparison unit 75b. Third comparison unit 75b ascertains whether or not the ascertained probability density value is greater than or equal to a third threshold value $T_b$. If the ascertained probability density value is greater than or equal to third threshold value $T_b$, third comparison unit 75b transmits a third decision value to decision unit 76 which characterizes that no anomaly is present in the second sensor recording of input signal $x_{70}$. Otherwise, third comparison unit 75b selects the third decision value in such a way that it characterizes the presence of an anomaly in the second sensor recording. Optionally, third comparison unit 75b may also transmit the probability density value, ascertained by the second of the three second anomaly detection models 73b, to decision unit 76.

A third of the three second anomaly detection models 73c corresponds to a third sensor recording of input signal $x_{70}$. The third of the three second anomaly detection models 73c receives the three sensor recordings $x_{70}$. The third of the three second anomaly detection models 73c then ascertains a probability density value that characterizes how probable an occurrence of the third sensor recording of the three sensor recordings of input signal $x_{70}$ is, given an occurrence of the other sensor recordings of input signal $x_{70}$. The third of the three second anomaly detection models 73c then transmits the ascertained probability density value to a fourth comparison unit 75c. Fourth comparison unit 75c ascertains whether or not the ascertained probability density value is greater than or equal to a fourth threshold value $T_c$. If the ascertained probability density value is greater than or equal to fourth threshold value $T_c$, fourth comparison unit $75c$ transmits a fourth decision value to decision unit 76 which characterizes that no anomaly is present in the third sensor recording of input signal $x_{70}$. Otherwise, fourth comparison unit $75c$ selects the fourth decision value in such a way that it characterizes the presence of an anomaly in the third sensor recording. Optionally, fourth comparison unit $75c$ may also transmit the probability density value, ascertained by the third of the three second anomaly detection models $73c$, to decision unit 76.

Based on the transmitted decision values, decision unit 76 determines whether an anomaly is present, and if yes, in which of the sensor recordings of input signal $x_{70}$ the anomaly is present. Optionally, decision unit 76 may additionally determine this based on the transmitted probability density values. If the first decision value characterizes the absence of an anomaly, anomaly detection device 70 outputs an anomaly detection output $y_{70}$ which characterizes that no anomaly is present. If the first decision value characterizes the presence of an anomaly, the decision unit ascertains at least one decision value from the set of the second decision value, the third decision value, and the fourth decision value which characterizes the absence of an anomaly. Anomaly detection output $y_{70}$ in this case is selected by decision unit 76 in such a way that it characterizes the presence of an anomaly in the sensor recording for which the decision value was ascertained.

Optionally, also more than one sensor recording may be characterized as anomalous by anomaly detection output $y_{70}$. Optionally, in addition a sensor recording may be characterized as anomalous by anomaly detection output $y_{70}$ only when the probability density value, ascertained by second anomaly detection model $73a$, $73b$, $73c$ corresponding to the sensor recording, falls below the probability density values, ascertained by the other second anomaly detection models $73a$, $73b$, $73c$, by a predefined extent.

The limitation to three sensor recordings is selected by way of example in this exemplary embodiment. Anomaly detection device 70 may also be used mutatis mutandis for a different plurality of sensor recordings in input signal $x_{70}$.

Figure 2:
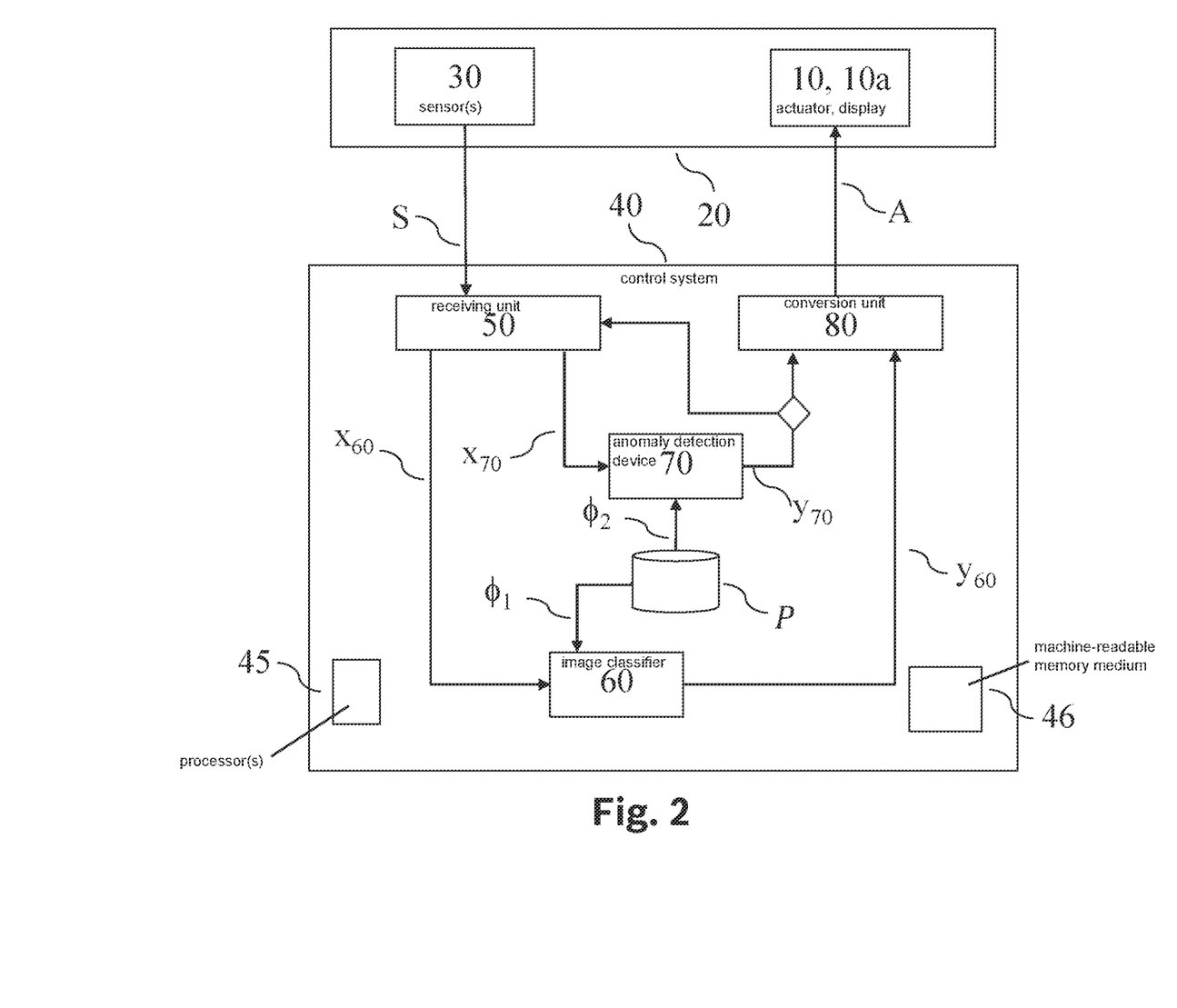
FIG. 2 schematically shows a design of a control system for activating an actuator, in accordance with an example embodiment of the present invention.

FIG. 2 shows an actuator 10 in its surroundings 20 in interaction with a control system 40. Surroundings 20 are detected in multiple sensors 30 at preferably regular time intervals. Sensors 30 encompass imaging sensors, such as cameras. Optionally, sensors 30 may also encompass other types of sensors, for example those that may measure the physical surroundings conditions or operating conditions of control system 40.

The signals of sensors S are transmitted to control system 40. Control system 40 thus receives a sequence of sensor recordings S. Control system 40 ascertains activation signals A therefrom, which are transferred to actuator 10.

Control system 40 receives the sequence of sensor recordings S of sensor 30 in an optional receiving unit 50, which converts the sequence of sensor recordings S into a sequence of input images $x_{60}$. An input image $x_{60}$ may be, for example, a detail or a further processing of a sensor recording of a camera, contained in sensor recordings S. Input image $x_{60}$ includes individual frames of a video recording. In other words, input image $x_{60}$ is ascertained as a function of sensor recording S. The sequence of input images $x_{60}$ is supplied to an image classifier 60, which in the exemplary embodiment is a neural network.

Control system 40 includes anomaly detection device 70. In this exemplary embodiment, the anomaly detection device is configured to ascertain anomalies in sensor recordings S of imaging sensors 30. In further exemplary embodiments, it is conceivable for anomaly detection device 70 to be configured to detect anomalies in sensor recordings S of other types of sensors. The sequence of sensor recordings S is converted by receiving unit 50 into a sequence of input signals $x_{70}$ for the anomaly detection device. If the anomaly detection device is configured to ascertain anomalies in sensor recordings of imaging sensors, input signals $x_{70}$ may optionally also include input image $x_{60}$.

Image classifier 60 is preferably parameterized by first parameters $\phi_1$, which are stored in a parameter memory P and provided by same. Anomaly detection device 70 is preferably parameterized by second parameters $\phi_2$, which are stored in the parameter memory and provided by same.

From input images $x_{60}$, image classifier 60 ascertains output variables $y_{60}$ that characterize a classification of input images $x_{60}$. Anomaly detection device 70 ascertains an anomaly detection output $y_{70}$ from input signals $x_{70}$.

Output variables $y_{60}$ and anomaly detection output $y_{70}$ are supplied to a conversion unit 80 which ascertains activation signals A therefrom, which are supplied to actuator 10 in order to appropriately activate actuator 10. An output variable $y_{60}$ includes information concerning objects to be recognized on a corresponding input image $x_{60}$.

Actuator 10 receives activation signals A, is appropriately activated, and carries out a corresponding action. Actuator 10 may be an activation logic, which is not necessarily structurally integrated, and which from activation signal A ascertains a second activation signal via which actuator 10 is then activated.

If anomaly detection output $y_{70}$ characterizes the presence of an anomaly, activation signal A may be selected in such a way that the possible actions of actuator 10 are limited. If no anomaly is present, it is conceivable for the possible actions to be limited based not on an anomaly, but, rather, based on surroundings 20 of control system 40 ascertained by image classifier 60. In addition, in the event of the presence of an anomaly, it is conceivable for at least portions of sensor recordings S to be transmitted to a manufacturer or operator of control system 40.

Alternatively or additionally, it is possible for anomaly detection output $y_{70}$ to be also transmitted to receiving unit 50. For example, for the case that an anomaly is present in sensor recording S from which input image $x_{60}$ is ascertained, the receiving unit may then select some other sensor recording for ascertaining input image $x_{60}$.

In further specific embodiments, control system 40 includes sensors 30. In yet further specific embodiments, control system 40 alternatively or additionally includes actuator 10.

In further preferred specific embodiments of the present invention, control system 40 includes at least one processor 45 and at least one machine-readable memory medium 46 on which instructions are stored, which when executed on processors 45 then prompt control system 40 to carry out the method according to the present invention.

In alternative specific embodiments, a display unit $10a$ is provided as an alternative to or in addition to actuator 10. In the event of the presence of an anomaly, display unit $10a$ may be activated in such a way that, for example, the presence is displayed to a user or operator of the control system.

Figure 3:
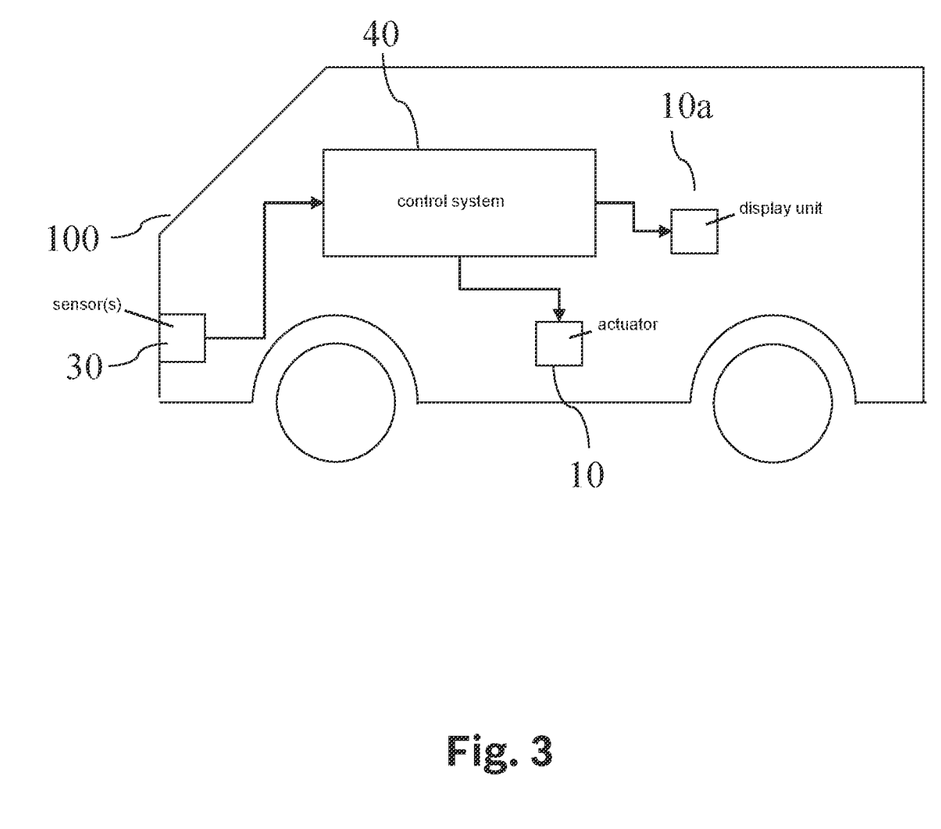
FIG. 3 schematically shows one exemplary embodiment for controlling an at least semi-autonomous robot, in accordance with an example embodiment of the present invention.

FIG. 3 shows how control system 40 may be used for controlling an at least semi-autonomous robot, in the present case an at least semi-autonomous motor vehicle 100.

Sensors 30 may be, for example, a plurality of video sensors preferably situated in motor vehicle 100. Receiving unit 50 may then forward at least one sensor recording S of the video sensors as input images $x_{60}$ to image classifier 60.

Image classifier 60 is configured to identify objects from input images $x_{60}$.

Actuator 10, which is preferably situated in motor vehicle 100, may be, for example, a brake, a drive, or a steering system of motor vehicle 100. Activation signal A may then be ascertained in such a way that actuator or actuators 10 is/are activated in such a way that motor vehicle 100 prevents, for example, a collision with the objects identified by image classifier 60, in particular when these are objects of certain classes, for example pedestrians.

Alternatively, the at least semi-autonomous robot may be some other mobile robot not depicted, for example one that moves by flying, swimming, diving, or walking. The mobile robot may also be, for example, an at least semi-autonomous lawn mower or an at least semi-autonomous cleaning robot. Also in these cases, activation signal A may be ascertained in such a way that the drive and/or the steering system of the mobile robot are/is activated in such a way that the at least semi-autonomous robot prevents, for example, a collision with objects identified by artificial neural network 60.

Alternatively or additionally, display unit 10a may be activated via activation signal A, and for example the ascertained safe areas may be displayed. In addition, for example for a motor vehicle 100 with a nonautomated steering system, it is possible for display unit 10a to be activated via activation signal A in such a way that the display unit outputs a visual or acoustic warning signal when it is ascertained that motor vehicle 100 is in danger of colliding with one of the reliably identified objects.

Figure 4:
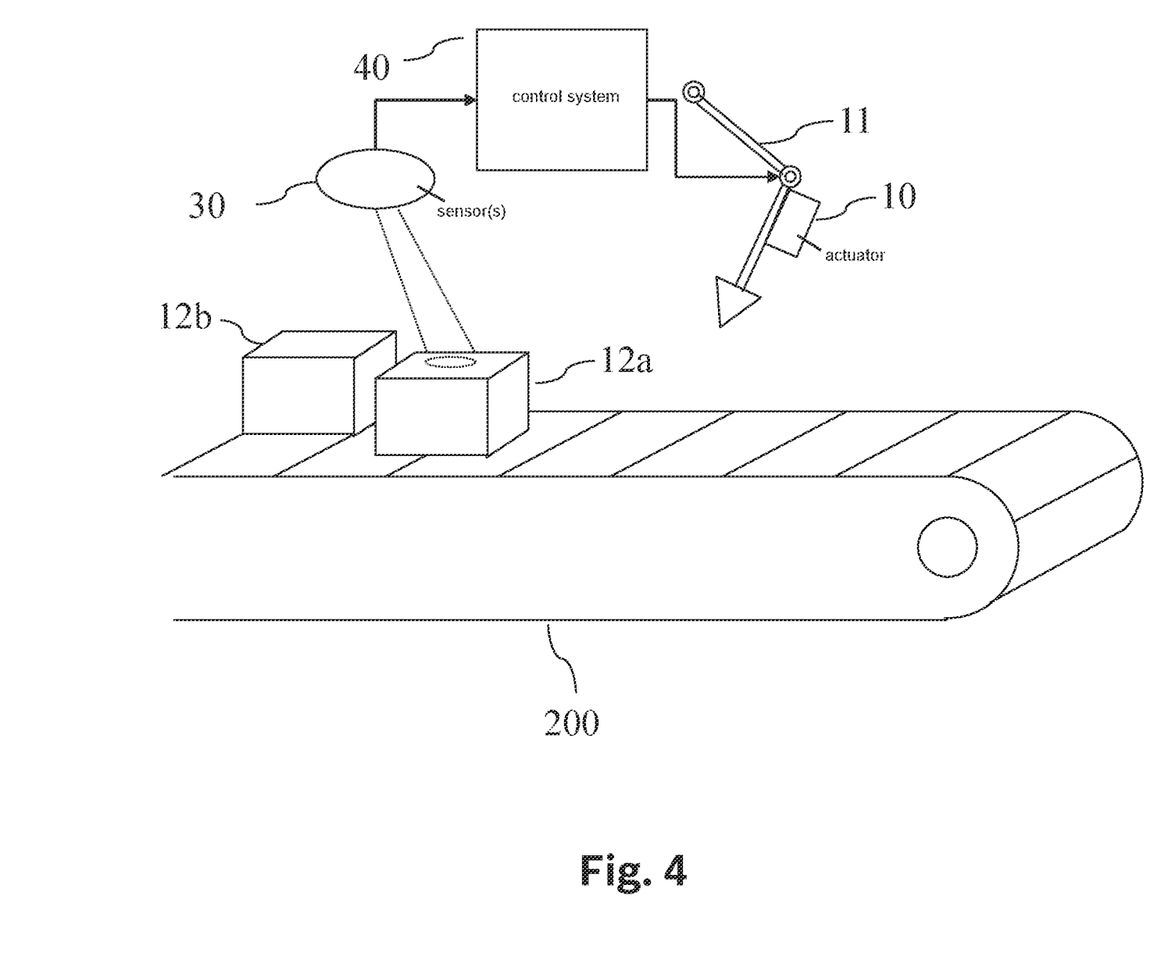
FIG. 4 schematically shows one exemplary embodiment for controlling a manufacturing system, in accordance with an example embodiment of the present invention.

FIG. 4 shows one exemplary embodiment in which control system is used for activating a manufacturing machine 11 of a manufacturing system 200, in that an actuator 10 that activates this manufacturing machine 11 is activated. Manufacturing machine 11 may be, for example, a machine for punching, sawing, drilling, and/or cutting.

Sensors 30 may include an imaging sensor, for example, which for example detects properties of manufactured products 12a, 12b. It is possible for these manufactured products 12a, 12b to be movable. It is possible for actuator 10 which activates manufacturing machine 11 to be activated as a function of an association of detected manufactured products 12a, 12b, so that manufacturing machine 11 correspondingly carries out a subsequent processing step of correct manufactured product 12a, 12b. It is also possible to adapt manufacturing machine 11, corresponding to the same manufacturing step for processing a subsequent manufactured product, by identifying the correct properties of the same one of manufactured products 12a, 12b (i.e., without a misclassification).

In addition, manufacturing machine 11 may include sensors 30 that may measure the physical surroundings conditions or operating conditions of manufacturing machine 11. Sensor recordings S of these sensors 30 may be supplied to anomaly detection device 70 in order to determine whether manufacturing machine 11 is operating under normal surroundings conditions and in a normal operating condition. If an anomaly is detected by anomaly detection device 70, the operation of manufacturing machine 11 may, for example, be stopped or an automatic maintenance may be prompted.

Figure 5:
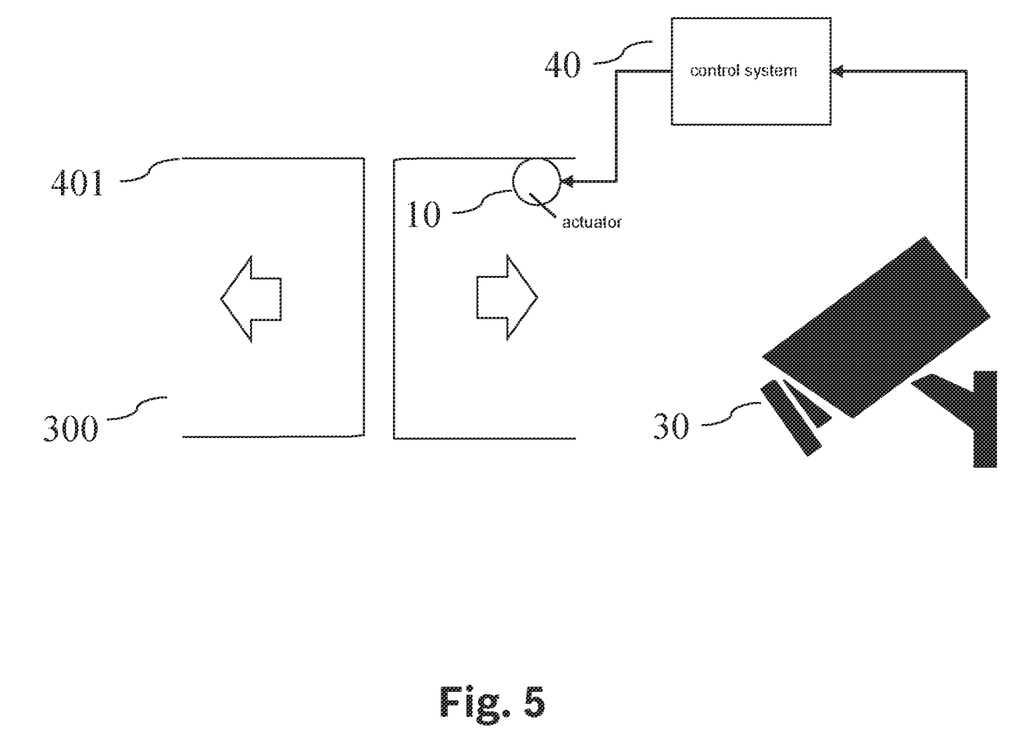
FIG. 5 schematically shows one exemplary embodiment for controlling an access system, in accordance with an example embodiment of the present invention.

FIG. 5 shows one exemplary embodiment in which control system 40 is used for controlling an access system 300. Access system 300 may encompass a physical access control, for example a door 401. Sensors 30 may be video sensors, for example, that are configured to detect persons in front of access system 300. Detected input images $x_{60}$ may be interpreted with the aid of image classifier 60. If multiple persons are detected at the same time, via an association of the persons, i.e., of the objects, with one another, for example the identities of the persons may be ascertained in a particularly reliable manner, for example by analyzing their movements. Actuator 10 may be a lock that enables or does not enable the access control, for example opens or does not open door 401, as a function of activation signal A. For this purpose, activation signal A may be selected as a function of the interpretation by object identification system 60, for example as a function of the ascertained identity of the person. Instead of the physical access control, a logical access control may be provided.

The images of sensors 30 may be supplied to anomaly detection device 70 as input signals $x_{70}$. If anomaly detection device 70 detects an anomaly, the access may be at least temporarily blocked and/or an investigation by security personnel may be automatically prompted.

Figure 6:
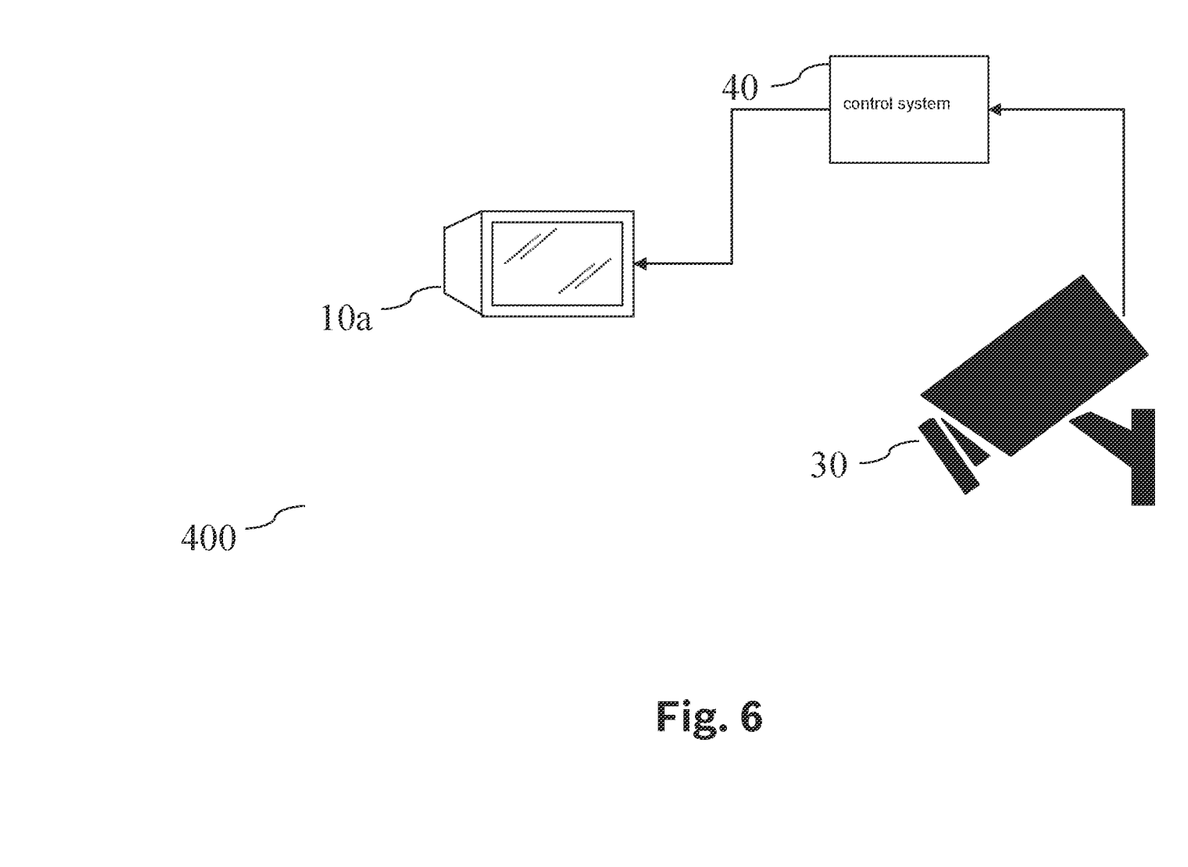
FIG. 6 schematically shows one exemplary embodiment for controlling a supervising system, in accordance with an example embodiment of the present invention.

FIG. 6 shows one exemplary embodiment in which control system 40 is used for controlling a supervising system 400. This exemplary embodiment differs from the exemplary embodiment illustrated in FIG. 5 in that instead of actuator 10, display unit 10a is provided, which is activated by control system 40. For example, artificial neural network 60 may reliably ascertain an identity of the objects recorded by sensors 30 in order to independently deduce, for example, which are suspicious, and activation signal A may then be selected in such a way that this object is highlighted in color by display unit 10a.

Figure 7:
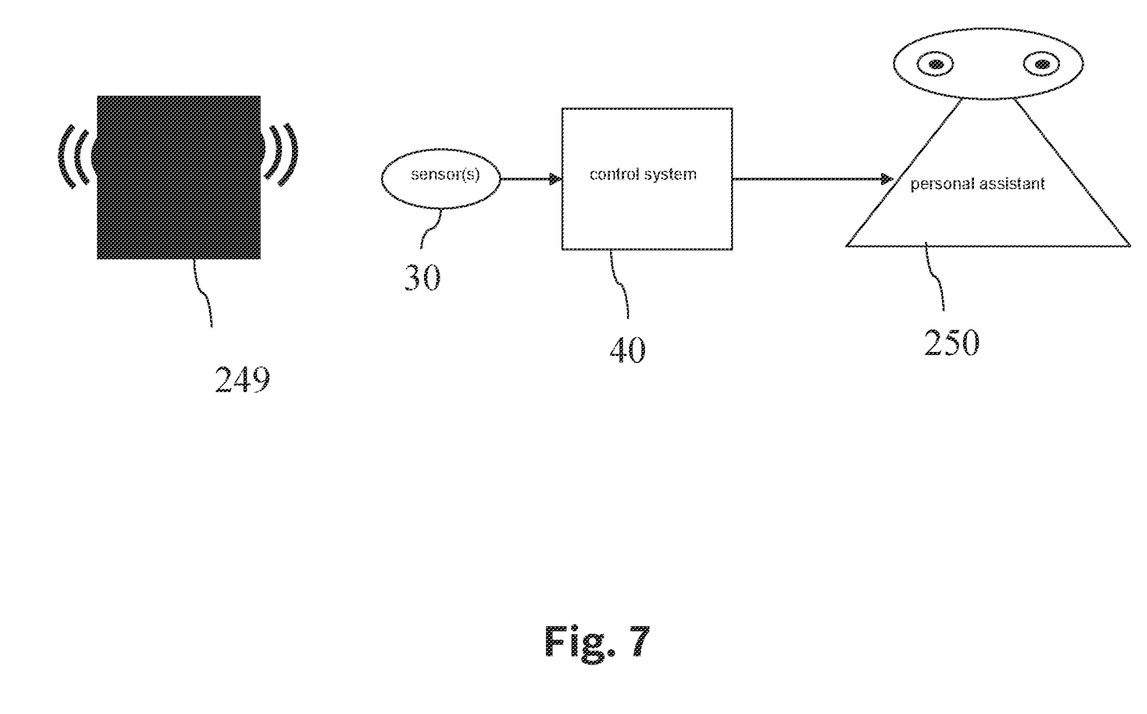
FIG. 7 schematically shows one exemplary embodiment for controlling a personal assistant, in accordance with an example embodiment of the present invention.

FIG. 7 shows one exemplary embodiment in which control system 40 is used for controlling a personal assistant 250. Sensors 30 are preferably video sensors that receive images of a gesture of a user 249.

As a function of sensor recordings S of sensor 30, control system 40 ascertains an activation signal A of personal assistant 250, for example by the neural network carrying out a gesture recognition. This ascertained activation signal A is then transmitted to personal assistant 250, which is thus appropriately activated. This ascertained activation signal A in particular may be selected in such a way that it corresponds to a presumed desired activation by user 249. This presumed desired activation may be ascertained as a function of the gesture recognized by artificial neural network 60. Control system 40, as a function of the presumed desired activation, may then select activation signal A for transmission to personal assistant 250 and/or select activation signal A for transmission to personal assistant 250, corresponding to the presumed desired activation.

This corresponding activation may involve, for example, personal assistant 250 retrieving information from a database and reproducing it so it is apprehensible for user 249.

Instead of personal assistant 250, a household appliance (not depicted), in particular a washing machine, a stove, an oven, a microwave, or a dishwasher may be provided to be appropriately activated.

Figure 8:
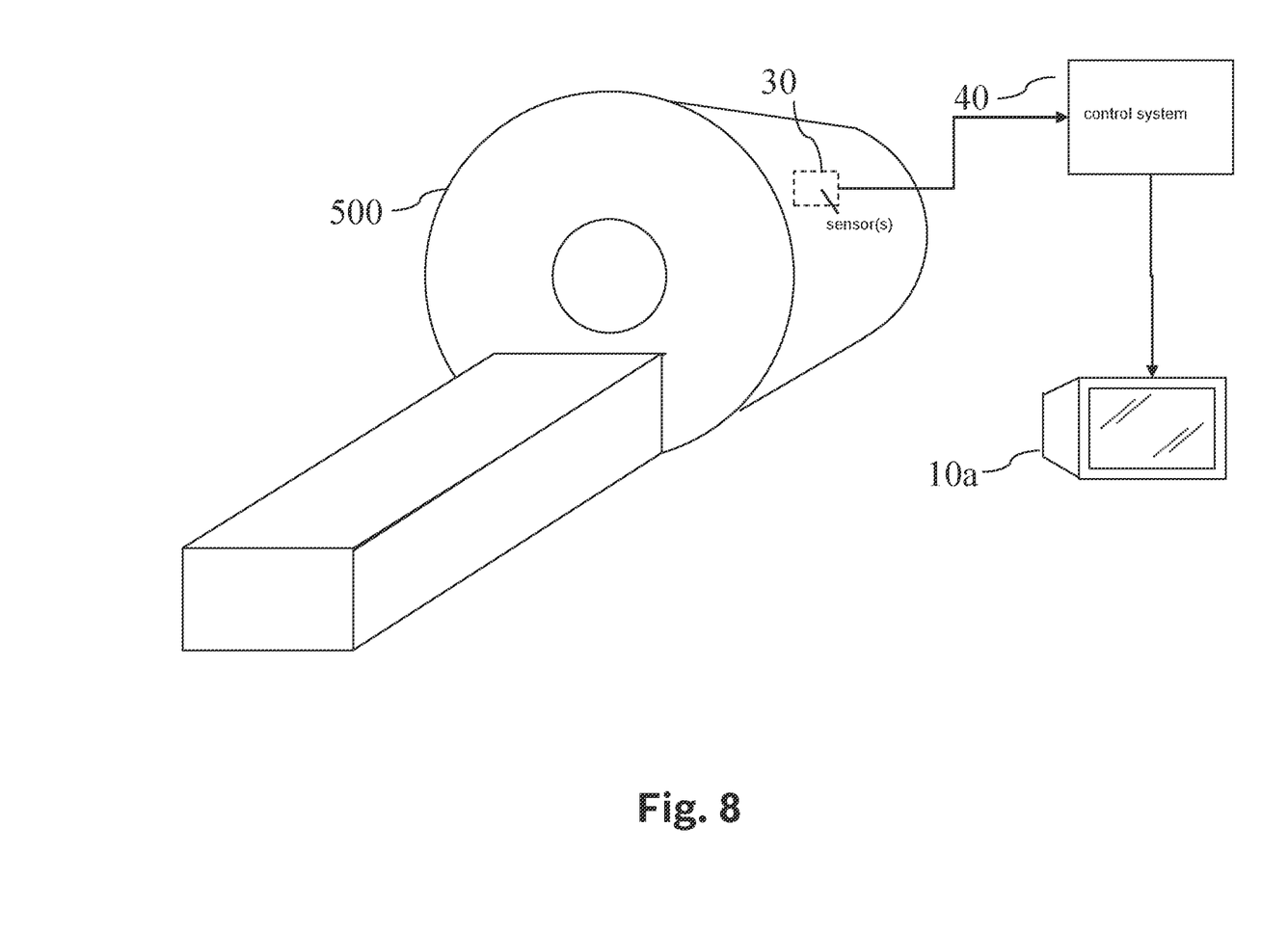
FIG. 8 schematically shows one exemplary embodiment for controlling a medical imaging system, in accordance with an example embodiment of the present invention.

FIG. 8 shows one exemplary embodiment in which control system 40 is used for controlling a medical imaging system 500, for example an MRT, X-ray, or ultrasound device. Sensors 30 may be provided by imaging sensors, for example, and display unit 10a is activated by control system 40. For example, image classifier 60 may ascertain whether an area recorded by at least one imaging sensor is conspicuous, and activation signal A may then be selected in such a way that this area is highlighted in color by display unit 10a.

The images of sensors 30 are transmitted as input signals $x_{70}$ to anomaly detection device 70. For the case that an anomaly is detected, this may, for example, be represented on display unit 10a and/or a maintenance of system 500 may be automatically prompted.

Figure 9:
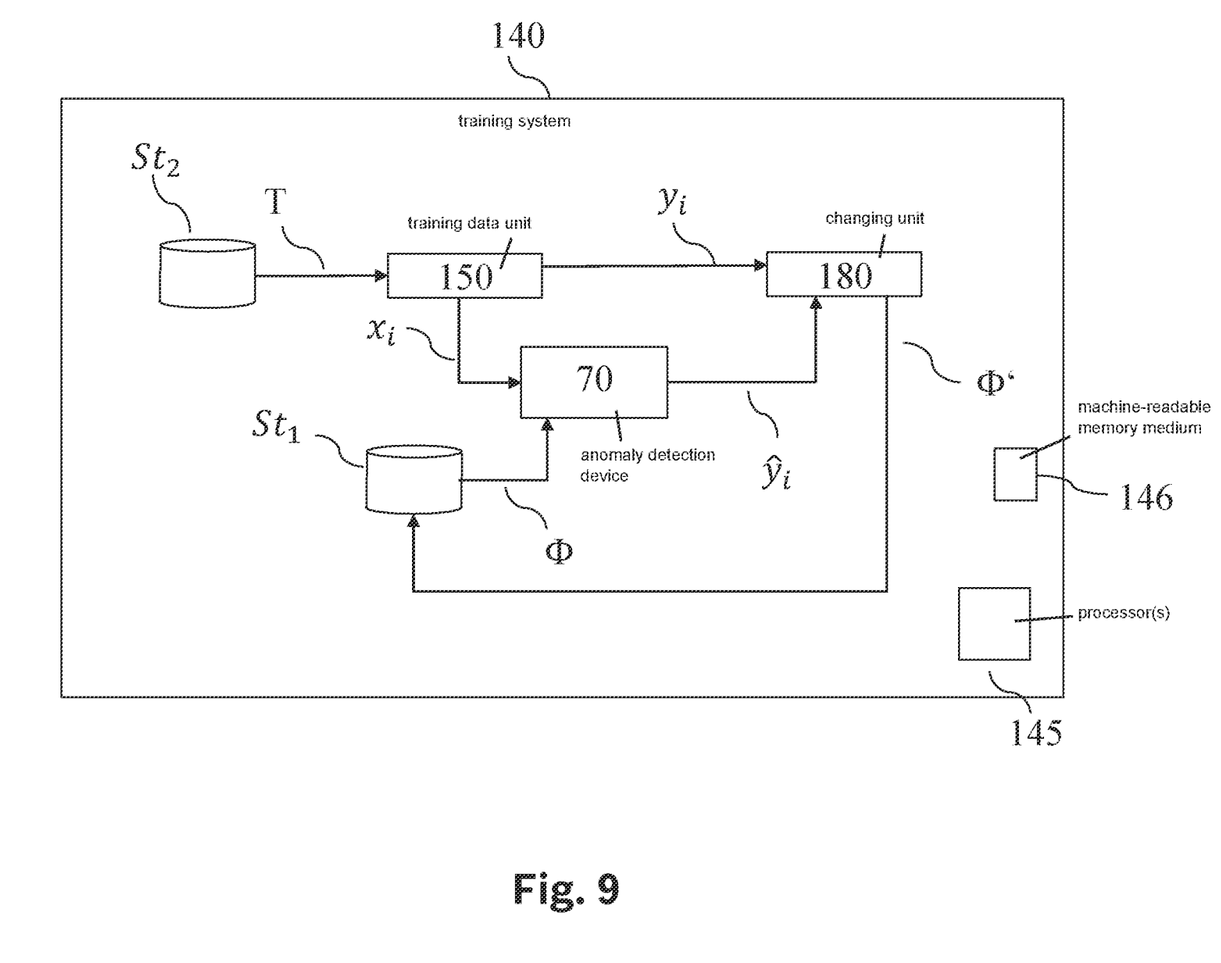
FIG. 9 schematically shows a design of a training device for training the anomaly detection device, in accordance with an example embodiment of the present invention.

FIG. 9 shows one exemplary embodiment of a training system 140 that is designed to train anomaly detector 70. For the training, a training data unit 150 accesses a computer-implemented database $St_2$, database $St_2$ including at least one training data set T, training data set T in each case including tuples $x_i$ of sensor recordings.

Training data unit 150 ascertains at least one tuple $x_i$ of sensor recordings of training data set T and transmits tuple $x_i$ to anomaly detection device 70. Anomaly detection device 70 determines a first anomalous value or a plurality of second anomalous values with the aid of the first anomaly detection model and the plurality of second anomaly detection models.

The first anomalous value and the plurality of second anomalous values are transmitted as output $\hat{y}_i$ to a changing unit 180.

Based on ascertained output $\hat{y}_i$ and a desired output $y_i$ of a desired first anomalous value and of a plurality of desired second anomalous values, changing unit 180 then determines new model parameters $\Phi'$ for the first anomaly detection model and/or the plurality of second anomaly detection models. In the exemplary embodiment, the first anomaly detection model is a normalizing flow and the second anomaly detection models are in each case a conditional normalizing flow. In this case, changing unit 180 may ascertain new model parameters $\Phi'$ with the aid of a gradient descent method such as stochastic gradient descent or Adam.

Ascertained new model parameters $\Phi'$ are stored in a model parameter memory $St_1$.

In further exemplary embodiments, the described training is iteratively repeated for a predefined number of iteration steps or iteratively repeated until a difference between ascertained output $\hat{y}_i$ and desired output $y_i$ falls below a predefined threshold value. In at least one of the iterations, new model parameters $\Phi'$ determined in a previous iteration are used as model parameters $\Phi$ of the anomaly detection device.

Furthermore, training system 140 may include at least one processor 145 and at least one machine-readable memory medium 146 that contains commands which when executed by processor 145 prompt training system 140 to carry out a training method according to one of the aspects of the present invention.

The term "computer" encompasses arbitrary devices for processing predefinable calculation rules. These calculation rules may be present in the form of software, or in the form of hardware, or also in a mixed form made up of software and hardware.

What is claimed is:

1. A computer-implemented method for detecting anomalies in a plurality of sensor recordings of a technical system, comprising the following steps:

ascertaining a first anomalous value which, with regard to all sensor recordings of the plurality of sensor recordings, characterizes whether or not an anomaly is present, the first anomalous value being based on a probability density value which indicates how probable a joint occurrence of the plurality of sensor recordings is;

ascertaining a plurality of second anomalous values, each of the second anomalous values from the plurality of second anomalous values corresponding to a respective sensor recording of the plurality of sensor recordings, each of the second anomalous values, with regard to the respective sensor recording and under the condition of an occurrence of the other sensor recordings, characterizing whether or not an anomaly is present in the respective sensor recording, and each of the second anomalous values being based on a probability density value which indicates how probable an occurrence of the respective sensor recording is given an occurrence of the other sensor recordings;

detecting an anomaly in a specific sensor recording of the plurality of sensor recordings when the first anomalous value characterizes the presence of an anomaly, and the second anomalous value corresponding to the specific sensor recording characterizes an anomaly, and the second anomalous value corresponding to the specific sensor differs beyond a predefined extent from the other second anomalous values of the plurality of second anomalous values.

2. The method as recited in claim 1, wherein the first anomalous value is ascertained using a first anomaly detection model.

3. The method as recited in claim 1, wherein the plurality of second anomalous values is ascertained using a plurality of second anomaly detection models, each of the second anomaly detection models of the plurality of second anomaly detection models corresponding to a respective sensor recording, and ascertaining the second anomalous value corresponding to the respective sensor recording.

4. The method as recited in claim 2, wherein the first anomaly detection model encompasses a normalizing flow model, and/or each of the second anomaly detection models encompasses a conditional normalizing flow model.

5. An anomaly detection device configured to detect anomalies in a plurality of sensor recordings of a technical system, device configured to:

ascertain a first anomalous value which, with regard to all sensor recordings of the plurality of sensor recordings, characterizes whether or not an anomaly is present, the first anomalous value being based on a probability density value which indicates how probable a joint occurrence of the plurality of sensor recordings is;

ascertain a plurality of second anomalous values, each of the second anomalous values from the plurality of second anomalous values corresponding to a respective sensor recording of the plurality of sensor recordings, each of the second anomalous values, with regard to the respective sensor recording and under the condition of an occurrence of the other sensor recordings, characterizing whether or not an anomaly is present in the respective sensor recording, each of the second anomalous values being based on a probability density value which indicates how probable an occurrence of the respective sensor recording is given an occurrence of the other sensor recordings; and detect an anomaly in a specific sensor recording of the plurality of sensor recordings when the first anomalous value characterizes the presence of an anomaly, and the second anomalous value corresponding to the specific sensor recording characterizes an anomaly, and the second anomalous value corresponding to the specific sensor differs beyond a predefined extent from the other second anomalous values of the plurality of second anomalous values.

6. A computer-implemented method for training an anomaly detection device, the method comprising the following steps:

providing a plurality of sensor recordings of the technical system or of a technical system having the same design or of a similar technical system;

training the first anomaly detection model based on the plurality of sensor recordings, the first anomaly detection model being trained in such a way that the first anomaly detection model ascertains a first anomalous value which, with regard to all sensor recordings of the plurality of sensor recordings, characterizes whether or not an anomaly is present, the first anomalous value being based on a probability density value which indicates how probable a joint occurrence of the plurality of sensor recordings is; and training a plurality of second anomaly detection models, each of the second anomaly detection models configured for a respective sensor recording of the plurality of sensor recordings and being trained in such a way that the second anomaly detection model ascertains a second anomalous value for the respective sensor recording which characterizes whether or not an anomaly is present in the respective sensor recording under the condition of an occurrence of the other sensor recordings of the plurality of sensor recordings, the second anomalous value being based on a probability density value which indicates how probable an occurrence of the respective sensor recording is given an occurrence of the other sensor recordings.

7. A training device configured to train an anomaly detection device, the device configured to:

provide a plurality of sensor recordings of the technical system or of a technical system having the same design or of a similar technical system;

train the first anomaly detection model based on the plurality of sensor recordings, the first anomaly detection model being trained in such a way that the first anomaly detection model ascertains a first anomalous value which, with regard to all sensor recordings of the plurality of sensor recordings, characterizes whether or not an anomaly is present, the first anomalous value being based on a probability density value which indicates how probable a joint occurrence of the plurality of sensor recordings is; and train a plurality of second anomaly detection models, each of the second anomaly detection models configured for a respective sensor recording of the plurality of sensor recordings and being trained in such a way that the second anomaly detection model ascertains a second anomalous value for the respective sensor recording which characterizes whether or not an anomaly is present it the respective sensor recording under the condition of an occurrence of the other sensor recordings of the plurality of sensor recordings, the second anomalous value being based on a probability density value which indicates how probable an occurrence of the respective sensor recording is given an occurrence of the other sensor recordings.

8. A non-transitory machine-readable memory medium on which is stored a computer program for training an anomaly detection device, the computer program, when executed by a computer, causing the computer to perform the following steps:

providing a plurality of sensor recordings of the technical system or of a technical system having the same design or of a similar technical system;

training the first anomaly detection model based on the plurality of sensor recordings, the first anomaly detection model being trained in such a way that the first anomaly detection model ascertains a first anomalous value which, with regard to all sensor recordings of the plurality of sensor recordings, characterizes whether or not an anomaly is present, the first anomalous value being based on a probability density value which indicates how probable a joint occurrence of the plurality of sensor recordings is; and training a plurality of second anomaly detection models, each of the second anomaly detection models configured for a respective sensor recording of the plurality of sensor recordings and being trained in such a way that the second anomaly detection model ascertains a second anomalous value for the respective sensor recording which characterizes whether or not an anomaly is present it the respective sensor recording under the condition of an occurrence of the other sensor recordings of the plurality of sensor recordings, the second anomalous value being based on a probability density value which indicates how probable an occurrence of the respective sensor recording is given an occurrence of the other sensor recordings.

\* \* \* \* \*